March 6, 1934.    R. G. HALL    1,949,905
IGNEOUS CONCENTRATION OF ZINC ORES
Filed May 18, 1931
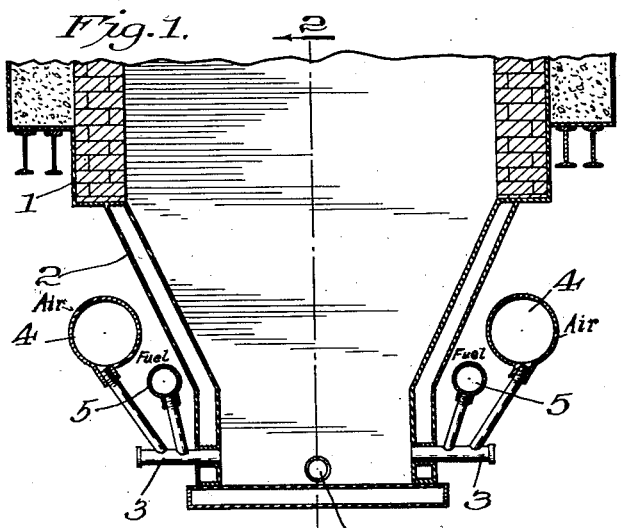
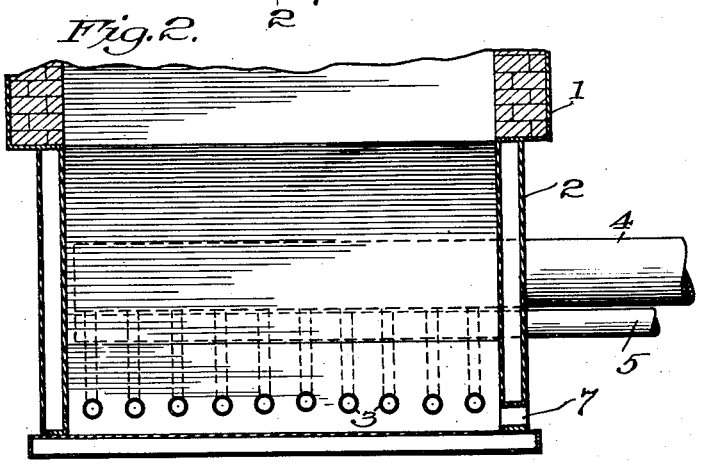
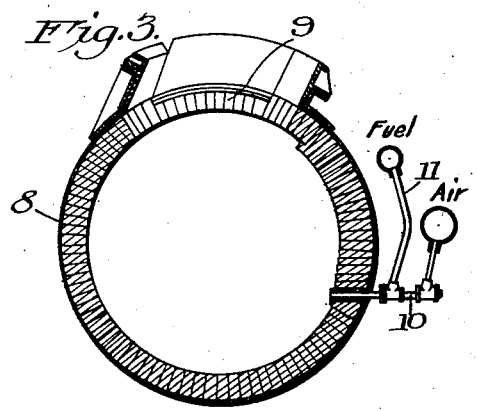
INVENTOR.
Robert G. Hall,
BY Arthur P. Knight &
Alfred W. Knight
ATTORNEYS.

Patented Mar. 6, 1934

1,949,905

UNITED STATES PATENT OFFICE 1,949,905

IGNEOUS CONCENTRATION OF ZINC ORES

Robert G. Hall, San Francisco, Calif.

Application May 18, 1931, Serial No. 538,196

4 Claims. (Cl. 75—28)

This invention relates to improvements in igneous concentration of zinc ores, and the main object of the invention is to provide for heat treatment of zinc ores in such manner as to substantially separate zinc in the form of oxide from other metallic or non-metallic constituents of the ore.

In the treatment of ores, concentrates and other zinc-containing materials for the recovery of metallic zinc or for the manufacture of zinc pigments, it is most economical and desirable that the zinc mineral should first be concentrated to the highest possible degree and separated from other minerals which may or may not contain metals of economic value. Sulphide ores must next be converted to oxides, and it is necessary that the conversion be carried out by the roasting of the contained sulphur to the lowest possible contents.

In the process of concentration it is frequently the case that due to minuteness of crystallization of the various minerals, difficulties are encountered in effecting a complete separation, either of the minerals containing valuable constituents such as copper or the precious metals (that is to say, a heavy metal reducible and non-volatile under the conditions of the process as hereinafter set forth), or in discarding minerals such as those of iron, having under the circumstances no economic value. Thus many ores of zinc are associated with copper, precious metals and iron, various non-metallic minerals and other impurities. The concentrate of zinc minerals may, in such cases, carry substantial quantities of other impurities impossible to separate by mechanical methods, and these in the subsequent treatment of the concentrate for metallic zinc or for pigment may prove to be harmful. This is the case with iron and certain other elements in the retort process as well as in the electrolytic process. Also, small quantities of commercially valuable metals, such as copper or the precious metals, may become so diluted in the process of retort smelting as to have their entire value dissipated.

In the roasting operation the presence of these diluents and impurities is objectionable. Thus, the presence of silica causes the formation of silicate of zinc and this silicate of zinc remains largely insoluble in the process of dissolving the zinc for recovery by the electrolytic process; or though the zinc so combined with silica actually may dissolve, it gives rise to mechanical conditions which are undesirable in the solution. The presence of iron is even more deleterious whether the iron be actually a constituent of the zinc mineral as in marmotite, or be a separate mineral as pyrite or any of the other natural forms of iron. These give rise in the process of roasting to combinations of iron oxide with zinc oxide, known generally as ferrites, ferrates, or zincates, which are with difficulty soluble in the electrolyte in the electrolytic process and which are equally undesirable in the retort process.

I have discovered that the process of roasting zinc ores for the elimination of sulphur prior to further treatment may be so combined with a further concentration process as to produce an oxide of zinc substantially free from the impurities above referred to. The zinc oxide so produced lends itself readily to the production of metallic zinc by any of the standard methods of electrolysis or by retort smelting. This discovery involves the use of fused magmas which will act when molten as solvents for zinc sulphide and for zinc oxide, and thereby become menstruums in which the reactions of oxidation and reduction can, under proper conditions, be carried out.

The accompanying drawing illustrates apparatus suitable for carrying out my invention, Fig. 1 being a vertical section of the lower portion of a blast furnace which is adapted for that purpose, and Fig. 2 a vertical section on line 2—2 in Fig. 1. Fig. 3 is a vertical section of a form of converter adapted for carrying out my invention.

The whole operation of roasting or oxidation and subsequent reduction, may be appropriately carried out in one vessel, and such a method is found most convenient. Such a vessel may be one of the many forms of blast furnace, either rectangular or round in cross-section, having the sides and ends composed partly or wholly of refractory materials or of water jackets, or partly of both as is most usually the case.

Figs. 1 and 2 show the lower portion of a blast furnace of suitable construction, said furnace being provided with suitable refractory walls 1 with water-jacketed bosh 2 and with tuyères indicated at 3 for supplying the blast of air to the charge in the furnace, said tuyères being supplied with air from a conduit 4 and being also supplied with fuel from a conduit 5. Compressed air is supplied to the conduit 4 by any suitable means and at any suitable pressure, and the fuel may be supplied to conduit 5 in any suitable manner depending on the character of the fuel, for example, if natural gas or the like is used, the same may be supplied through conduit 5 at a suitable pressure to cause it to be injected into and mixed with the air in the tuyère 3, and if liquid or powdered solid fuel is used, the same may be injected or fed into the conduit 5 in any suitable manner and forced from said conduit into the tuyère 3 by maintaining a sufficiently high pressure of air in the conduit 5. Means such as a tap hole 7 is provided for withdrawing melted material from the bottom of the furnace.

Or the reaction vessel may take the form of a converter of the Bessemer type as is used in steel manufacture, or the Manhees type as used in conversion of copper matte to metallic copper. A furnace of this type is shown in Fig. 3 comprising a cylindrical body or chamber 8 lined with refractory material and having a charging opening 9 in its top and a tuyère 10 for forcing air into the convertor chamber, said tuyère being also provided with a fuel supply pipe 11 through which fuel may be introduced in the manner above stated. The convertor may be mounted and operated in the usual manner to provide for tilting so as to discharge the contents thereof when required.

In any case, such a lining is used as will be most refractory to the charge or material under treatment, and it is necessary that the tuyères shall be so modified in form as to permit of the introduction continuously or intermittently of reduction material. This reduction material will most generally take the forms of hydrocarbon gas, fuel oil or fuel oil gas, or finely divided solid carbonaceous materials, such fuels having the characteristic that when they are oxidized in the operation of reducing the zinc, volatile products are formed which are expelled from the magma and therefore do not interfere with the recovery of commercially valuable metals from the magma.

My improved process generally comprises two successive steps or stages, namely, an oxidizing stage, in which the zinc sulphide is converted to oxide, and a reducing stage in which the zinc oxide is reduced and volatilized as metallic zinc, and an important feature of my invention is that both of these operations are carried out while the zinc compound present is in igneous solution in suitable magmas.

I have found that the first step in the process, the oxidation of zinc sulphide, is greatly promoted by the presence of the sulphides of iron and copper, either or both. These compounds are usually present in ores of this character as received, especially the sulphide of iron, and at the temperature of the furnace or converter formation of a fusible matte takes place readily. Such matte acts as a magma for solution of zinc sulphide, and thereby the process of oxidation of the sulphur and of the zinc takes place more readily than would be the case were zinc sulphide alone submitted to the reactions of the process. Zinc sulphide alone at the temperature of the reaction is fusible with difficulty and oxidation takes place quite slowly.

But oxidation under the conditions mentioned, either with the presence or absence of iron and/or copper sulphide, will not entirely eliminate the zinc and discharge it from the vessel. Some part of the zinc which has been oxidized from the sulphide compound to the oxide compound will remain infusible or difficultly fusible in the reacting vessel unless means for dissolving zinc oxide in igneous solution shall have been provided.

A fusible magma for zinc oxide is found in a basic combination of ferrous oxide with a relatively small quantity of silica and lime. Thus I have been able, by the use of such a magma, to produce an igneous solution containing as high as thirty-five percent (35%) of zinc oxide and as low as ten percent (10%) of silica with a small quantity of lime, the balance being protoxide of iron.

I have further found that the zinc oxide may be reduced in such a menstruum to metallic zinc which is, at the temperature of the reaction, entirely volatilized and carried out by the gases from the vessel in which the reaction takes place.

There are two distinct steps and two distinct requirements:

(a) The oxidizing step, requiring the presence in the vessel of a quantity of a copper and/or iron sulphide, either added or formed therein by the introduction of sulphide ores or by the fusion of such an ore as a separate operation. Such material will hold in igneous solution the zinc sulphide of the ore and thereby promote its oxidation. The reaction of oxidation will proceed without the presence of such molten sulphide, but it will proceed less rapidly and with somewhat greater difficulty.

The oxidation of the sulphides of zinc and other metals being strongly exothermic will, in general, provide sufficient heat to maintain the reaction; but should this be insufficient such deficit may be made up by the introduction of carbonaceous fuel through the tuyères, or over the surface of the bath.

(b) The reducing step, requiring the presence in the vessel of a quantity of another magma capable of holding in solution zinc oxide. This, as explained above, may most readily be a basic compound of protoxide of iron and silica.

The preparation of this magma or menstruum may be done by fusing together a quantity of protoxide of iron with such an amount of silica, or silica and lime as may be necessary to produce a fairly low melting point magma. Or the magma itself may be already prepared in an operating metallurgical works and may be any fused material capable of holding in solution zinc oxide. I do not limit myself to a magma composed partly or largely of oxide of iron, but may use any solvent which is operative. The solvent may be prepared and brought to fusion either in a separate vessel or in the vessel provided for the subsequent reactions.

The magmas being in the vessel they are maintained in molten condition by blowing through the tuyères sufficient air for the purpose and simultaneously the necessary carbonaceous fuel may be introduced in the same manner. Zinc bearing material may now be introduced, and this may be done most conveniently by feeding such material through the top of the furnace or through the upper part above the charge, but it may also be introduced through the tuyères or at any convenient point. The blast through the tuyères will act to mix the solid or liquid material with the magmas. In the case of sulphides, oxidation of the sulphur and the metals will take place as it does in the familiar case of converting copper bearing matte to metallic copper, and as above stated, the oxidation may supply sufficient heat to maintain the magma at the proper temperature, say from 1250° C. to 1300° C.

The oxide of zinc thus formed will be held in igneous solution in the magma, though a substantial part may be volatilized as metallic zinc in the act of oxidation of the sulphide $ZnS+3O=ZnO+SO_2$ or $SnS+2O=Zn+SO_2$. Copper, lead, iron and other sulphides in the ore will likewise be oxidized and, as in the case of zinc, these will be wholly or partly absorbed in the menstruum and become part thereof. The processes of introduction and oxidation may be carried on simultaneously, or the material to be so oxidized may first be introduced and subsequently oxidized.

It is best that at this point the reaction of oxidation should not be carried so far as to completely oxidize the sulphides present in the vessel, as such compounds are a necessary means for carrying out the subsequent reactions in a satisfactory manner.

The introduction and oxidation of sulphides having been carried to the point where the oxide magma has become saturated with zinc oxide, as may be evidenced by a thickening and pastiness of the igneous solution, reduction is started. This is done by reducing the quantity of the air blast and introducing by the means provided reduction fuel. The zinc oxide is thereby reduced and the resulting metallic zinc is volatilized and expelled, also any lead oxide which may be present. Any copper or precious metals present will be in the metallic form or combined with sulphur, and with other non-volatile metals, will remain suspended or dissolved in the menstruum. Silica, alumina and lime will dissolve. The temperature of the magma during this stage of the operation may also be maintained at about 1250° C. to 1300° C.

It is to be noted that it is not necessary to carry either one of these reactions to completion before reversing the operation. A part of the sulphur should remain combined with the metallic elements present, and a part of the zinc oxide may remain dissolved in the oxide magma. But most of the zinc having been reduced and expelled the operation is again reversed. All or most part of the reduction fuel is cut off, the air blast is increased and new sulphides are introduced again to saturation. This is repeated until the reaction vessel has filled up or until the magmas become so altered or saturated by the additions of other constituents that they will no longer function adequately as solvents for the zinc compounds.

From the point of saturation mentioned above, the reduction is continued until the magmas are commercially freed from zinc. Copper or precious metals will be collected by the sulphide material remaining, or a sufficient quantity of a sulphide of iron, a sulphide of copper, or a mixed sulphide may be added. The magma is agitated until this addition becomes incorporated with it in a molten state.

Where no copper is already present in the vessel it will be found desirable but not wholly necessary, to add some copper compound with the added sulphides. This promotes the formation of molten matte containing copper, which is a valuable collector for the precious metals present. Or metallic lead may be added as a collector of the precious metals, and will function in this respect similarly to a matte. It will be understood that when lead is present in or added to the ore, some of the lead will in general be volatilized as oxide, and will in that case be collected along with the zinc oxide, the lead and zinc then being separated by subsequent operation in well known manner. My process, however, is particularly applicable and advantageous in connection with ores in which the zinc concentrates are greatly in excess of lead contents, as in most zinc concentrates of the western part of the United States, and where the other constituents of the ore have to be smelted in the course of the operation to recover the precious metal and the copper present.

On completion of the final reduction operation the mixture is thereupon tapped out or otherwise removed from the vessel, preferably through a standard form of settler, whereby the matte or base bullion is trapped out and recovered and the excess of oxide magma removed enough, however, being reserved for starting a repetition of the process, if desired.

Where the zinc sulphide bearing ore or products contain material amounts of iron sulphide as well as other sulphides, it most frequently happens that the proportion of silica is low and it is simple to maintain the essentially ferruginous character of the magma. In rare cases the zinc-bearing material may contain larger amounts of silica and lime; in such cases the reserved portion of the magma after recovery of the matte values is returned to the reacting vessel and such ferruginous material is added as will restore to the solvent the power to dissolve zinc oxide.

The process is not confined to the treatment of suphide ores, but by omitting the first or oxidation step of the process, the naturally or artificially oxidized material containing zinc oxide may be added directly to the reaction vessel either intermittently or continuously during the reduction period, all other steps of the process being exactly as before.

In certain cases a separate roasting of the sulphide may be desirable as for instance for the purpose of manufacturing sulphuric acid or other compounds of sulphur. In such cases the process will proceed as in case of oxide ores.

The gases from the reaction vessel can be treated by electrical precipitation for the recovery of the solid constituents, or the same end may be secured by filtration through any standard type of filter for gases.

The above described process will be found of great value in the treatment of the mixed ores and concentrates containing metals other than zinc, such as the commercially valuable metals copper and lead and the precious metals, gold and silver, also to separate zinc from the iron contents of ores and concentrated products. Thereby there is produced a highly concentrated product containing only zinc oxide and such other volatile materials as may exist in the ore. A concentrate commercially free from contaminating materials will thus be attained. Sulphur, if present in the oxide at all, will be found largely in the form of sulphite or sulphate which is easily eliminated. The zinc oxide is readily soluble in dilute acids, and if used in the retort process, is reducible and may be retorted at a lower temperature and with less corrosion on the retorts than where impure ores are used. In the case of silver, gold and copper, these metals are concentrated into the valuable form of a matte or base bullion where they are readily recoverable.

I claim:

1. The process of treating zinc sulphide ore for the separation of zinc from other materials which consists in forming a molten magma containing the zinc sulphide of the ore in igneous solution, subjecting the zinc sulphide while so dissolved to the action of an oxidizing agent and thereafter subjecting zinc oxide resulting from such oxidizing operation to the action of a reducing agent while maintaining in the magma a constituent or constituents capable of maintaining zinc oxide in igneous solution, volatilizing the reduced zinc from the magma and utilizing the residual magma in solution, for treatment of a further quantity of zinc sulphide ore in cyclic operation of the process.

2. The process of treating zinc sulphide ore which consists in forming a magma of such ore together with metallic sulphides capable of holding the zinc sulphide in igneous solution, subjecting the resulting product to oxidizing operation by bringing oxygen containing gas in contact therewith, maintaining in the resultant magma a constituent capable of retaining zinc oxide in igneous solution and, subsequently to the oxidizing operation, subjecting the product to a reducing operation by contact with a reducing agent while maintaining the temperature sufficiently high to volatilize the resultant zinc, and utilizing the residual magma, after volatilization of zinc therefrom, in cyclic operation of the process, in connection with a further quantity of zinc sulphide ore.

3. The process which consists in heating zinc sulphide together with copper and iron sulphides to form a molten magma containing the zinc sulphide in igneous solution, subjecting the magma to the action of oxygen bearing gas to oxidize the zinc sulphide to zinc oxide and to produce in the magma sufficient iron oxide to maintain the zinc oxide in the solution and thereafter subjecting the magma to the action of a reducing gas so as to produce and volatilize metallic zinc and utilizing the residual magma together with additional quantities of sulphide ores in cyclic operation of the process.

4. A process as set forth in claim 3 and comprising in addition, eventual treatment of the final magma resulting from cyclic operation of the process for recovery of copper matte.

ROBERT G. HALL.